Sept. 17, 1957   N. H. KENT ET AL   2,806,351
STARTING AND FUEL PUMPING MEANS FOR GAS TURBINE ENGINES
Filed May 6, 1954
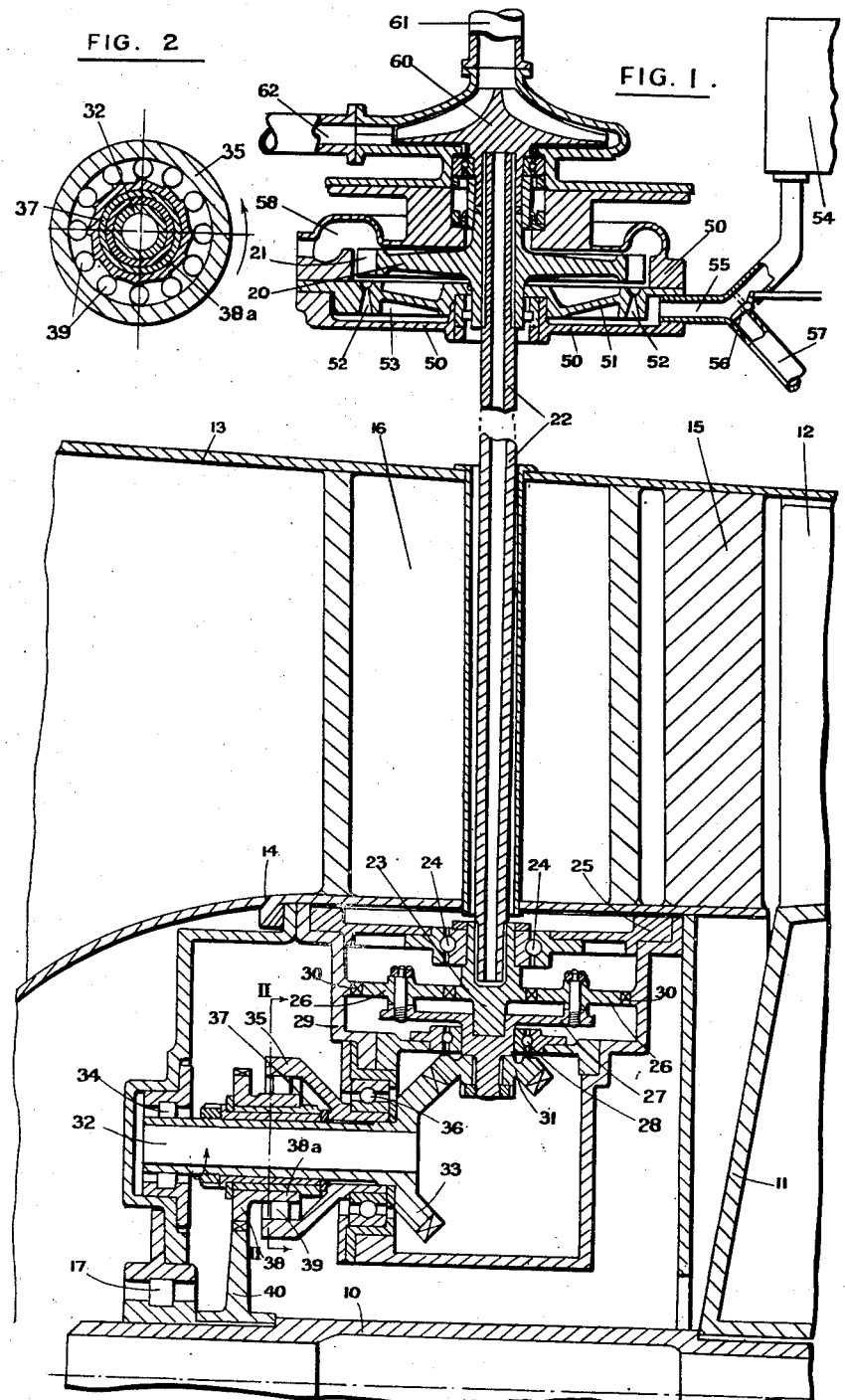

United States Patent Office  2,806,351
Patented Sept. 17, 1957

2,806,351
STARTING AND FUEL PUMPING MEANS FOR GAS TURBINE ENGINES

Nelson Hector Kent, Allestree, Derby, and Cyril Armer, Chellaston, Derby, England, assignors to Rolls-Royce Limited, Derby, England Application May 6, 1954, Serial No. 428,087

Claims priority, application Great Britain May 19, 1953

6 Claims. (Cl. 60—39.14)

This invention relates to gas turbine engines. Such engines normally comprise a compressor system which is driven by a gas-turbine and further include combustion equipment heating the working medium compressed by the compressor system prior to its passage through the gas-turbine. The starting of such engines is normally effected by rotating a compressor and turbine rotor system by motor means fed from an external power source, and it has hitherto been proposed to utilise an auxiliary gas-turbine as a starter motor, such auxiliary gas-turbine being fed with gas under pressure from a suitable source for example gas arising from the combustion of fuel in compressed air, or gas arising from a chemical reaction such as the decomposition of cordite or isopropyl nitrate.

Normally it has been the general practice in gas turbine engines to supply liquid fuel to combustion equipment by means of a pump mechanically driven by the engine, so that the pump rotates at a speed proportional to the speed of the compressor and turbine rotor system of the engine, and its delivery is in part at least dependent upon the speed of rotation. In certain cases pumps of a variable-capacity kind have been used, which enable the delivery of a quantity of fuel in excess of engine requirements to be avoided, for example in an engine for aircraft propulsion where the fuel requirement at a given engine speed is reduced on increase of altitude. An inherent problem, however, exists that a pump driven mechanically by the engine may be incapable of delivering sufficient fuel for starting, whilst when the engine is rotating at high speed it delivers or tends to deliver too much fuel. With a view to overcoming the disadvantages inherent in this problem, which may be accentuated where the gas-turbine engine is used for aircraft propulsion and the fuel consumption at a given speed of the engine is appreciably reduced at a high altitude, proposals have hitherto been made to drive a fuel pump by compressed air derived from the compressor system of a gas-turbine engine.

It is the primary object of the present invention to provide a fuel supply system for a gas-turbine engine in which certain of these disadvantages are avoided.

According to the present invention a gas-turbine engine includes a single auxiliary turbine which serves the dual purpose of a motor driving a compressor and turbine rotor system in starting and additionally driving a fuel pump in normal running of the engine.

The auxiliary turbine may also drive other engine auxiliaries such as lubricating pumps, hydraulic pumps and generators.

According to an important feature of the invention the auxiliary turbine additionally drives a fuel pump in starting. This fuel pump is preferably that which is driven by the turbine in normal running of the engine.

Adoption of the present invention permits a reduction in weight of the starter motor and fuel pump drive installation, and enables the delivery of the fuel pump to be controlled independently of the speed of rotation of the engine in normal running. Further, by using the important feature mentioned above the delivery of the fuel pump during starting can be adequate to meet the fuel requirements for starting, since the auxiliary turbine will drive the engine through reduction gearing and reach a speed approaching its maximum at a low rotational speed of the engine compressor and turbine rotor system.

Preferably the auxiliary turbine is drivingly connected with the compressor and turbine system for starting the gas-turbine engine through a free-wheel clutch device whereby, when the gas-turbine engine has started, the compressor and turbine rotor system can over run the auxiliary turbine. Alternatively a clutch device controlled by the speed of the compressor and turbine rotor system disconnects the auxiliary turbine from the compressor and turbine rotor system when the latter has been started.

According to a further feature of the invention the auxiliary turbine is driven after starting of the gas-turbine engine by compressed air derived from the compressor system of the engine. In arrangements according to this feature of the invention a suitable change-over valve may be provided for cutting off the source of gas under pressure supplying the auxiliary turbine during starting and connecting said auxiliary turbine to the compressor system of the engine at a suitable pressure location.

A preferred embodiment of the invention is diagrammatically illustrated in the accompanying drawings, in which:

Fig. 1 is a fragmentary, vertical, longitudinal central section through a gas turbine engine constructed in accordance with the present invention;

Fig. 2 is a transverse section taken on line II—II of Fig. 1 illustrating the overrunning clutch.

Figure 3:
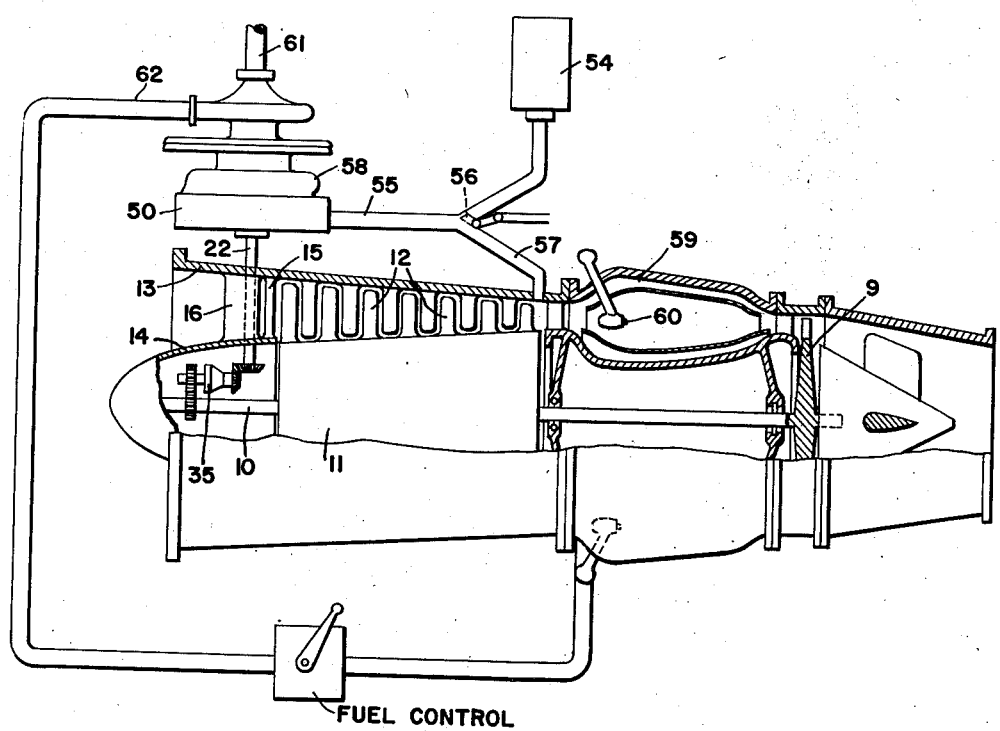
Fig. 3 is a view partly in elevation and partly in longitudinal, vertical central section of a complete gas turbine engine showing the relationship of the auxiliary turbine to the main engine.

In the drawings a compressor rotor shaft is shown at 10 supporting a rotor compressor drum structure 11 having rotor blading 12. The rotor blading 12 shown in Figure 1 is the first stage blading at the inlet of the compressor which has an annular air inlet passage defined between the walls 13 and 14. Immediately upstream of the rotor blading stationary inlet guide vane blading 15 is provided, and additionally hollow struts 16 extend across the annular duct to provide support structure between the inner and outer walls 13 and 14 whereby the rotor shaft 10 which is borne at its forward end in the roller bearing 17 is supported from the external wall 13. Such compressor rotor front bearing structure is well known in gas-turbine engines.

The compressor rotor shaft 10 mounts a coaxially-arranged turbine rotor 9, whereby the compressor is driven by the turbine. For starting purposes the turbine and compressor rotor system is rotated by a starter motor which in the arrangement shown in the drawings comprises an auxiliary turbine having a disc 20 and axial-flow turbine blading 21. The auxiliary turbine disc 20 is carried on a rotor shaft 22 which extends through a hollow strut 16, its inner end being in splined connection with a high-speed pinion 23.

In place of an axial-flow turbine a radial-flow auxiliary turbine may be used.

The gear 23 is supported by the ball-bearing 24 in structure 25 carried within the inner wall 14 of the air entry duct. The high-speed pinion 23 meshes with planet gear wheels 26 supported by a planet carrier 27. The latter is supported by the ball-bearing 28 in stationary structure 29 associated with the support structure 25. The stationary structure 29 comprise a cylindrical member having an internally toothed gear 30 which engages the planet wheels 26. An epicyclic reduction gear is thus provided between the rotor shaft 22 and a bevel output gear 31 supported by the planet carrier 27.

The reduction gear further comprises an intermediate layshaft 32 formed with a bevel gear 33 meshing with the bevel gear 31.

This layshaft is borne in the stationary structure supporting the bearing 17 by a roller bearing 34 and additionally carries in splined connection the outer annular member 35 of a free-wheel device. The annual member is borne in bearing arrangement 36 whereby the shaft 32 is carried in bearings 34 and 36. The shaft 32 additionally carries plain bearing bushing 37 on which a further pinion 38 is mounted for free rotation. The cylindrical extension 38A of this pinion forms the inner member of the free-wheel device, having intermediate rollers 39. The free-wheel device, better shown in Fig. 2 is of the well-known type having inclined ramp formations on the inner and/or outer members between which the rollers 39 jam in the sense of driving, thereby effecting a driving connection between the two parts. In the other sense the two parts are free for relative rotation. The pinion 38 further meshes with a gear-wheel 40, splined to the compressor rotor 10.

The arrangement above described provides a reduction gear train between the auxiliary turbine rotor shaft 22 and compressor rotor shaft 10, incorporating a free-wheel device, whereby the compressor rotor shaft 10 can overrun the turbine shaft 22 when the engine has started.

Referring now in greater detail to the construction of the auxiliary turbine it will be seen that the turbine disc 20 is rotatably borne in a stationary turbine casing 50 including a nozzle diaphragm structure 51 having convergent/divergent nozzles 52. The latter nozzles are fed from the annular space 53 between the diphragm 51 and stationary casing structure 50. For starting purposes a source of gas under pressure, diagrammatically illustrated at 54, is connected through duct 55 to the above mentioned annular space. The source of gas under pressure may be derived from the combustion of fuel in compressed air or other combustion or chemical process. Cordite and isopropyl nitrate are commonly used for this purpose.

The ducting 55 includes a valving arrangement 56 by which the duct 55 can alternately be connected to a pipeline 57 connected to the compressor system of the engine at a suitable pressure location as shown in Fig. 3. The gas after passing through the auxiliary turbine passes to atmosphere through an exhaust volute 58.

The valving arrangement 56 may be replaced by two separate valves selectively operated to effect the changeover.

The turbine rotor shaft is also in splined connection with the impeller 60 of a fuel pump of the centrifugal kind. Fuel enters the impeller through inlet ducting 61 connected to a fuel tank or other source of fuel, and is delivered from the impeller under pressure through the ducting 62. Fuel is delivered through the ducting 62 to the main combustion equipment 59 of the engine including the fuel injectors 60 as seen in Fig. 3.

It will be noted that no reduction gear is provided between the auxiliary turbine rotor and the impeller of the fuel pump. Thus, in starting, the impeller is driven at high speed and sufficient fuel is provided to the combustion equipment at a low rotational speed of the compressor and turbine rotor system of the engine. This is not possible where, as in conventional arrangements, the fuel pump supplying the combustion equipment is mechanically driven by the compressor and turbine rotor system, unless the pump is larger than required at the maximum engine speed.

As explained, for starting purposes the auxiliary turbine is connected to receive gas from the source at 54. When the engine has started, the valve 56 is moved to connect the pipeline 57 to the duct 55, so that the turbine continues to run on compressed air derived from the engine. This maintains the fuel supply to the combustion system.

An automatic speed-sensitive device may be used to control the operation of the valve 56. For example a centrifugal speed-sensitive device may be driven to sense the attainment of a pre-selected rotational speed of the compressor and turbine rotor system of the engine sufficient to provide a compressor delivery pressure appropriate for driving the air turbine by air compressed by the compressor system. Alternatively the valve 56 may be operated by a time-sensitive device.

Where the gas pressure source 54 comprises an auxiliary compressor, for example that of a small gas-turbine engine of a self-contained nature, the fuel supply to the latter (preferably from the source supplying the engine) may be controlled after starting of the main engine in accordance with the fuel requirements of the engine. In such an arrangement the main engine compressor tapping will not be provided. In yet another arrangement air tapped from the main engine compressor after starting may be fed to an auxiliary combustion chamber to heat the air prior to its admission to the auxiliary turbine.

What we claim is:

1. A gas turbine engine comprising a compressor, combustion equipment to which air is delivered by the compressor and including fuel injectors, and a turbine receiving products of combustion from said combustion equipment, said compressor and turbine each including a rotor, and said rotors being drivingly interconnected to form a compressor and turbine rotor system, an auxiliary turbine, an external source of gas under pressure, disconnectable driving means interconnecting said auxiliary turbine and said compressor and turbine rotor system, means connecting said auxiliary turbine with said source at least when said rotor system is rotated by said auxiliary turbine for starting purposes, a fuel pump connected to said fuel injectors to deliver fuel thereto, and a driving connection between said auxiliary turbine and said fuel pump operative at least during normal running of the engine when said driving means is disconnected.

2. A gas turbine system as claimed in claim 1 in which the fuel pump comprises a centrifugal pump the rotor of which is supported on the shaft of the auxiliary turbine.

3. A gas turbine engine as claimed in claim 1 wherein said disconnectable driving means comprises a free-wheel device.

4. A gas turbine engine comprising a compressor, combustion equipment to which air is delivered by the compressor and including fuel injectors, and a turbine receiving products of combustion from said combustion equipment, said compressor and turbine each including a rotor, and said rotors being drivingly interconnected to form a compressor and turbine rotor system, an auxiliary turbine, disconnectable driving means interconnecting said auxiliary turbine and said compressor and turbine rotor system, a fuel pump connected to said fuel injectors to deliver fuel thereto, and a driving connection between said auxiliary turbine and said fuel pump operative at least during normal running of the engine, an external source of gas under pressure, means for connecting said auxiliary turbine with said source when said rotor system is rotated for starting purposes, means for connecting said auxiliary turbine with a source of air compressed by said compressor during normal running of the engine and valve means for effecting changeover from said gas source to said compressor air source.

5. A gas turbine engine as claimed in claim 1, wherein said driving means comprises also reduction gearing, whereby said fuel pump is driven by the auxiliary turbine during starting at a greater rotational speed than the rotor system.

6. An accessory for use with a gas turbine engine having a compressor and a turbine on a common shaft and fuel injectors, comprising in combination, an auxiliary turbine, speed reducing gearing including an overrunning clutch connected to the said common shaft, a shaft connecting the auxiliary turbine to said speed reducing gearing whereby the gas turbine engine may be rotated by the auxiliary turbine for starting purposes, a fuel pump directly driven by said last mentioned shaft, an independent source of energy for connection to said auxiliary turbine, a source of energy from the main engine for connection to said turbine and selector valve means for determining the source of energy connected to said auxiliary turbine.

References Cited in the file of this patent

UNITED STATES PATENTS

| | | |
|---|---|---|
| 2,559,006 | Clapham | July 3, 1951 |
| 2,612,020 | Griffith | Sept. 30, 1952 |
| 2,631,426 | Jewett | Mar. 17, 1953 |
| 2,643,511 | Briggs | June 30, 1953 |